(12) United States Patent
Cornelissen et al.

(10) Patent No.: US 12,709,483 B2
(45) Date of Patent: Aug. 18, 2026

(54) SIDE FLEXING MODULAR CONVEYOR BELT AND HINGE PIN THEREFOR, AS WELL AS METHOD OF TRANSFERRING TENSILE LOAD IN A SIDE FLEXING MODULAR CONVEYOR BELT

(71) Applicant: Rexnord FlatTop Europe B.V., GV 's-Gravenzande (NL)

(72) Inventors: Leonardus Adrianus Catharinus Cornelissen, The Hague (NL); Cornelis Hendrik Mijndert Menke, The Hague (NL)

(73) Assignee: REXNORD FLATTOP EUROPE B.V., Gv's-Gravenzande (NL)

( * ) Notice: Subject to any disclaimer, the term of this patent is extended or adjusted under 35 U.S.C. 154(b) by 58 days.

(21) Appl. No.: 18/852,721

(22) PCT Filed: Mar. 31, 2023

(86) PCT No.: PCT/NL2023/050169
§ 371 (c)(1),
(2) Date: Sep. 30, 2024

(87) PCT Pub. No.: WO2023/200334
PCT Pub. Date: Oct. 19, 2023

(65) Prior Publication Data

US 2025/0223109 A1 Jul. 10, 2025

(30) Foreign Application Priority Data

Apr. 14, 2022 (NL) ..................................... 2031591

(51) Int. Cl.
*B65G 17/08* (2006.01)

(52) U.S. Cl.
CPC ........ *B65G 17/086* (2013.01); *B65G 2207/30* (2013.01)

(58) Field of Classification Search
None
See application file for complete search history.

(56) References Cited

U.S. PATENT DOCUMENTS 4,080,842 A * 3/1978 Lapeyre ................. B65G 17/08 474/228
4,222,483 A * 9/1980 Wootton ................ B65G 21/18 198/848
(Continued)

FOREIGN PATENT DOCUMENTS

DE 10-2017115269 1/2019
DE 102017115269 A1 * 1/2019 ........... B65G 17/086
(Continued)

OTHER PUBLICATIONS

International Search Report, Application No. PCT/NL2023/050169, International Searching Authority, dated May 30, 2023, 3 pages.

*Primary Examiner* — Gene O Crawford
*Assistant Examiner* — Muhammad Awais
(74) *Attorney, Agent, or Firm* — Armstrong Teasdale LLP

(57) ABSTRACT

Side flexing modular conveyor belt, comprising a plurality of rows of conveyor modules, the rows being arranged successively in a conveying direction, and each row comprising one or more conveyor modules arranged side by side transversely to the conveying direction, so that top faces of the conveyor modules together form a conveying plane. The modules are provided with forward link elements at a front side of the module that extend in conveying direction and with rearward link elements at a rear side of the module that extend opposite to the conveying direction, forward and rearward link elements of modules of successive rows being hingedly coupled with hinge elements that extend transversely to the conveying direction through hinge openings in the hinge elements so that the modules can rotate relative to each about a first axis in or parallel to the conveying plane
(Continued)

as well as about a second axis perpendicular to the conveying plane. The hinge elements between successive rows of conveyor modules comprise a main hinge pin that extends along the first axis across at least a center of the conveyor belt, and an auxiliary hinge pin that extends along the first axis from a lateral edge of the conveyor belt towards the center of the conveyor belt. The main hinge pin has a substantially constant cross section, preferably a cylindrical cross section, with a first dimension in conveying direction, and the auxiliary hinge pin includes a tapered section that tapers off towards said opposite lateral edge of the conveyor belt to a second, smaller dimension in conveying direction.

22 Claims, 8 Drawing Sheets

(56) References Cited

U.S. PATENT DOCUMENTS

| | | | | | |
|---|---|---|---|---|---|
| 4,858,753 | A * | 8/1989 | Hodlewsky | B65G 17/08 | 198/853 |
| 4,944,162 | A * | 7/1990 | Lang | F25D 25/04 | 198/852 |
| 5,024,321 | A * | 6/1991 | Lapeyre | B65G 17/08 | 198/853 |
| 5,105,938 | A * | 4/1992 | Tan | B65G 17/08 | 198/853 |
| 5,174,439 | A * | 12/1992 | Spangler | B65G 17/086 | 198/852 |
| 5,318,169 | A * | 6/1994 | Faulkner | B65G 17/086 | 198/853 |
| 5,645,160 | A * | 7/1997 | Palmaer | B65G 17/086 | 198/852 |
| 5,921,379 | A * | 7/1999 | Horton | B65G 17/086 | 198/852 |
| 6,073,756 | A * | 6/2000 | Damkjær | B65G 17/385 | 198/853 |
| 6,484,379 | B2 * | 11/2002 | Palmaer | B65G 21/18 | 198/852 |
| 6,837,367 | B1 * | 1/2005 | Klein | B65G 17/086 | 198/852 |
| 7,070,043 | B1 * | 7/2006 | MacLachlan | B65G 17/086 | 198/853 |
| 7,228,959 | B1 * | 6/2007 | Harrison | B65G 17/40 | 198/852 |
| 7,377,380 | B2 * | 5/2008 | Menke | B65G 17/06 | 198/852 |
| 8,678,178 | B2 * | 3/2014 | Bickel, Jr. | B65G 21/18 | 198/853 |
| 2001/0042677 | A1 * | 11/2001 | Palmaer | B65G 17/08 | 198/853 |
| 2004/0007448 | A1 * | 1/2004 | Cediel | B65G 17/08 | 198/851 |
| 2005/0126895 | A1 * | 6/2005 | Layne | B65G 17/086 | 198/852 |
| 2008/0023304 | A1 * | 1/2008 | Elsner | B65G 17/086 | 198/852 |
| 2013/0306446 | A1 * | 11/2013 | Neely | B65G 17/083 | 198/853 |
| 2014/0231227 | A1 * | 8/2014 | Sharma | B65G 15/30 | 198/853 |
| 2015/0027859 | A1 * | 1/2015 | Westergaard | B65G 17/086 | 198/853 |
| 2016/0060041 | A1 * | 3/2016 | Miller | B65G 17/086 | 198/853 |

FOREIGN PATENT DOCUMENTS

| | | | | |
|---|---|---|---|---|
| JP | 2013151332 | | 8/2013 | |
| JP | 2013151332 | A * | 8/2013 | |
| WO | WO-9101261 | A1 * | 2/1991 | B65G 17/086 |

* cited by examiner 2
25
23
16
22
15
21
10
15
16

SIDE FLEXING MODULAR CONVEYOR BELT AND HINGE PIN THEREFOR, AS WELL AS METHOD OF TRANSFERRING TENSILE LOAD IN A SIDE FLEXING MODULAR CONVEYOR BELT

RELATED APPLICATIONS

This application is a 35 U.S.C. § 371 national phase application of PCT/NL2023/050169 (WO-2023/200334 A1), filed on Mar. 31, 2024, entitled "SIDE FLEXING MODULAR CONVEYOR BELT AND HINGE PIN THEREFOR, AS WELL AS METHOD OF TRANSFERRING TENSILE LOAD IN A SIDE FLEXING MODULAR CONVEYOR BELT", which application claims the benefit of NL-2031591 filed Apr. 14, 2022, all of which are incorporated herein by reference in their entirety.

The invention generally relates to the field of conveying, and more specifically to side flexing modular conveyor belts.

Modular conveyor belts are generally known, and are for example used for conveying discrete products, for example food items, packages or bottles.

Modular conveyor belts are built up of conveyor belt modules. Conveyor belt modules are usually manufactured by molding, and are often manufactured from a plastics material. The conveyor belt modules are typically made out of thermoplastic material, and are typically integrally formed in one piece in a mold by injection molding.

Due to the modularity, the length of the modular conveyor belt can be varied by arranging rows of conveyor modules successively in a conveying direction, and coupling successive rows of modules. The width of the belt can be varied by arranging a number of modules side by side in the row transverse to the conveying direction. The number of modules in each row may be one, but preferably the number of modules in each row is two or more. Modules that are placed in successive rows may be staggered relatively to each other transverse to the conveying direction so as to form a conveyor mat having a brick laid pattern. Top faces of the modules together form a conveying plane for supporting products to be conveyed. Modules may be designed to be reversible upside down, and may in such case be arranged in the mat so that a bottom face of a module functions acts as top face. Modules may be reversible forward to backward, and may in such case be arranged in the mat so that forward facing protrusions act as rearward facing protrusions and vice versa. Modular conveyor belts are usually of endless design, so that a top run of the modular conveyor belt can circulate over a conveying track that extends in a conveying direction between return elements, and on which bottom faces of the modules can be slidingly supported. A bottom run of the modular conveyor belt can circulate over a return track that extends between the return elements. The return elements may be formed by return guides or return wheels, usually sprocket wheels.

Modular conveyor belts may be driven by several types of drive arrangements that apply a tensional load on the belt. For example, sprocket wheels may be provided with teeth that engage the bottom of the modular belt, e.g. at a drive pocket provided in a bottom surface of the conveyor belt module, and may be used to drive the modular conveyor belt. Modular belts may also be driven by sprocket wheels or other drive elements that engage an end face of a link end, a transversely extending drive bar in the module, and/or a side of the modular belt.

Conveyor belt modules for modular conveyor belts typically have a module body with a top face for supporting products to be transported, and a bottom surface for sliding over a conveying track. The module bodies are typically provided with link elements at the front and rear with which successive module bodies may be coupled so that top faces of conveyor belt modules in the top run can jointly form a conveying plane. Consecutive modules are hingedly coupled about an axis in or parallel to the conveying plane transversely to the conveying direction so that the modules can rotate relative to each other to pass along the return element. The link elements may extend outward from a central portion of the body, in conveying direction at the front, and in opposite direction at the rear. The link elements may be interspaced transversely to the conveying direction, such that link elements of successive modules may interdigitate. The link elements may be provided with aligned hinge openings in the link elements, so that successive modules may be coupled with hinge pins that extend transversely to the conveying direction through the hinge openings. Such conveyor belts may run on a straight conveying track, and have fixed pitch between consecutive modules when under tension. When running straight under tension applied by the drive, the tensile load is evenly distributed over al link elements.

In so called side flexing conveyor belts consecutive modules are further hingedly coupled about an axis perpendicular to the conveying plane so that in addition to running straight on a straight portion of the conveying track, the modules can rotate relative to each other to pass along a bend in the conveying track. Typically, such side flexing belts may be provided with elongate hinge openings in the link elements, e.g. in forward link elements at the front of the module that extend in conveying direction and/or in rearward link elements that extend opposite to the conveying direction at the rear of the module. In addition, the interspace between adjacent link elements may transverse to the conveying direction be broadened to allow a link element of a consecutive module to slide into the interspace upon rotation of consecutive modules about an axis perpendicular to the conveying plane, so that consecutive modules can collapse into each other to a position of reduced pitch at at least a radial inward portion of the conveyor belt. This allows the modular conveyor belt to pass along a relatively tight bend in the conveying track.

Side flexing belts may be arranged to collapse inward at both edges of the belt, so as to allow the conveyor belt to pass both left and right hand bends in the conveying track. In other applications the side flexing conveyor belt may be arranged to collapse at one edge only, and to substantially maintain pitch or increase pitch at the opposite edge. Such side flexing belts can negotiate bends in the conveyor track in one direction only. Such side flexing belts may be used to run in a so called curve conveyor, in which the conveying track is curved in a horizontal plane, and may optionally be provided with a straight lead-in and/or a straight lead-out section. Such side flexing belts may also be used in a so called spiral conveyor, in which a relatively large portion of the conveying track follows a spiral path, typically with a relatively short straight lead-in and/or a straight lead-out section. Spiral conveyors are typically used to buffer products, and/or to convey products through a heating or cooling track with relatively slow progression due to a relatively small pitch of the spiral conveying track, e.g. for baking, cooking, cooling or freezing products.

Although very satisfactory in many regards, a disadvantage of the present conveyor belts is that when negotiating a bend, due to the collapsing movement of subsequent modules, the tensile load is carried on the set of cooperating forwardly and rearwardly extending protrusions of subsequent modules that is disposed at the radial outer edge of the side flexing belt only. This significantly limits the tensile load that can be applied to the belt.

It has been proposed in WO98/06648 to provide a side flexing modular conveyor belt with hinge pins extending across the width of the conveyor belt having a cylindrical mid section and conical end portions. The mid section is transversely fixed and the conicity of the end portions is chosen to match the width and turn radius of the belt, so that when rounding a bend, the conical end portions cooperate with a plurality of radially outwardly disposed protrusion. A disadvantage of this solution is that is has proven difficult in practice to position the hinge pin so that a radial outwardly end portion indeed engages a plurality of radial outward protrusions. Also, the hinge pin is difficult and relatively costly to manufacture, and in practice limits the modularity to a dedicated width.

To mitigate this problem, it has been proposed in WO2004007320 to provide dedicated end modules at the radial outsides of the conveyor belt, of which the protrusions have been provided with hinge apertures of which the portions that contact the hinge pin are placed on a curve. A disadvantage of this solution is that the dedicated end modules are relatively costly, and that for different conveyor widths and different turn radius to conveyor width ratios different dedicated end modules need to be provided.

For spiral conveyors, due to their relatively long length, in practice conveyor belt modules are used that for a substantial portion made of metal. A disadvantage of this solution is that such spiral conveyor belt modules are relatively costly. Also, the metal is relatively heavy, which-due to the relatively long length of spiral conveyors-adds up to limit the length or load of the conveyor.

An object of the invention therefore is to mitigate the above mentioned drawbacks, preferably while at least substantially maintaining or improving the advantages. In particular, the invention aims to provide a side flexing modular conveyor belt of plastics material with which the tensile load may be increased in a relatively simple and cost effective way, and/or with which the modularity is maintained to a higher degree. Thereto the invention provides for a side flexing modular conveyor belt, comprising a plurality of rows of conveyor modules, the rows being arranged successively in a conveying direction, and each row comprising one or more conveyor modules arranged side by side transversely to the conveying direction, so that top faces of the conveyor modules together form a conveying plane, the modules being provided with forward link elements at a front side of the module that extend in conveying direction and with rearward link elements at a rear side of the module that extend opposite to the conveying direction, forward and rearward link elements of modules of successive rows being hingedly coupled with hinge elements that extend transversely to the conveying direction through hinge openings in the hinge elements so that the modules can rotate relative to each about a first axis in or parallel to the conveying plane as well as about a second axis perpendicular to the conveying plane, wherein the hinge elements between successive rows of conveyor modules comprise a main hinge pin that extends along the first axis across at least a center of the conveyor belt, and an auxiliary hinge pin that extends along the first axis from a lateral edge of the conveyor belt towards the center of the conveyor belt, wherein the main hinge pin has a substantially constant cross section, preferably a cylindrical cross section with a first cross sectional dimension in conveying direction, and wherein the auxiliary hinge pin includes a tapered section that tapers off towards said opposite lateral edge of the conveyor belt to a second, smaller dimension in conveying direction adjacent the lateral edge of the conveyor belt.

By providing an auxiliary hinge pin with a section that tapers off towards the lateral edge of the conveyor belt, a separate section of the hinge element is provided that may be used with conventional plastic side flexing modules. When running straight the tensile load can be transferred by the main hinge pin only, and when rounding a turn by the auxiliary hinge pin only. Due to it being a separate section of the hinge element, positioning the auxiliary hinge pin to engage a plurality of radial outward protrusions when negotiation a turn is facilitated. This allows the auxiliary hinge pin to reliably cooperate with a number of sets of cooperating protrusions when rounding a turn. Also, the provision of the auxiliary hinge pin as a separate section of the hinge element makes it simply and relatively inexpensive to manufacture. In particular, the conveyor belt may be made up of standard modules to a desired width and be used for a desired turn radius, and only a set of auxiliary hinge pins need be provided from which an auxiliary hinge pin may be selected that has a taper to match the chosen conveyor width and width to turn radius ratio. Auxiliary hinge pins of different taper for such set are relatively inexpensive to manufacture. Modularity of the system may further be maintained as the cylindrical main hinge pin may be relatively easily be adapted in length so as to together with the auxiliary hinge pin provide a hinge element to match a desired width of the conveyor belt.

When the tapered section of the auxiliary hinge pin tapers from the first dimension in conveying direction near the main hinge pin a smooth transfer in cross section between the main and auxiliary hinge pin may be obtained. To further facilitate transfer in cross section, the auxiliary hinge pin may include a cylindrical section between the main hinge pin and the tapered section.

The tapered section may be substantially conical, and may e.g. include curved (e.g. convex) longitudinal sides, but may e.g. also include straight (e.g. linear) sides. The taper of the tapered section may be continuous in axial direction, but may e.g. also be discontinuous (e.g. stepped). The tapered section may be symmetrical in axial cross section (e.g. circular), but may also be asymmetrical (e.g. elongate) in conveying direction. The forward and rearward faces of the tapered section are preferably shaped to cooperate with conventional elongate hinge openings with half cylindrical end portions. However, the tapered section may e.g. be wedge shaped with a rectangular cross section, i.e. with flat forward and rearward faces that cooperate with flat end portions of square hinge openings.

The tapered section may e.g. extend along at least 2 sets of cooperating forward and rearward protrusions of modules of successive rows, and may preferably extend along at least 5 of 10 sets of cooperating forward and rearward protrusions of modules of successive rows.

The tapered section may e.g. extend along at less than 10 sets of cooperating forward and rearward protrusions of modules of successive rows, and may preferably extend along at least 5 sets of cooperating forward and rearward protrusions of modules of successive rows.

The axial length of the main hinge pin may be relatively long compared to the axial length of the auxiliary hinge pin, and may e.g. be at least 2× the axial length of the main hinge pin, preferably at least 5× or at least 10× the axial length of the auxiliary hinge pin.

The auxiliary hinge pin may be relatively short, e.g. be less than half the axial length of the main hinge pin. The axial length of the auxiliary hinge pin may be relatively short in absolute sense, and may e.g. be less than about 10 cm or about 4 inch. It may be more than about 2.5 cm or about 1 inch to allow cooperation with a sufficiently large plurality of cooperating protrusions when rounding a bend.

For cost effective and precise manufacture, the auxiliary hinge pin may be injection molded. The main hinge pin may cost effectively be extruded and made to a standard length, and cut to a desired size when assembling a conveyor belt of a desired width.

The material properties of the auxiliary hinge pin may differ from the material properties of the main hinge pin, and may in particular be chosen to withstand a higher tensile load, and/or to e.g. have a better wear resistance or lower friction. The auxiliary hinge pin may e.g. be made of a different grade of the same material, of a different class of material, or of a different type material than the main hinge pin.

The auxiliary hinge pin may include a radial protrusion at the lateral edge of the conveyor belt adjacent the tapered section to prevent rotation about its axis and or axial migration. Elegantly, the auxiliary hinge pin is substantially L shaped, the tapered section forming the leg of the L shape and the radial protrusion forming the foot of the L shape.

The radial protrusion may be held at the lateral edge of the conveyor belt with play so as to allow limited sliding movement along its longitudinal axis, limited sliding movement transverse to its longitudinal axis and/or limited rotational movement about an axis perpendicular to the conveying plane for settlement of the auxiliary hinge pin into contact with a plurality of cooperating forward and rearward protrusions. In particular, this may be arranged by holding the leg of an L shaped auxiliary hinge pin in a slightly oversized locking chamber provided in a lateral edge of the conveyor belt, e.g. in a lateral outward end of an end module.

The hinge elements between successive rows of conveyor modules may comprise a further auxiliary hinge pin that extends along the first axis from an opposite lateral edge of the conveyor belt towards the center of the conveyor belt, wherein the further auxiliary hinge pin includes a section that is substantially conical, and that tapers off towards said opposite lateral edge of the conveyor belt from said first diameter near the main hinge pin to said second, smaller diameter adjacent near said opposite lateral edge of the conveyor belt. This way the side flexing belt may be arranged to pass both left and right hand bends in the conveying track.

The hinge openings in the link elements may be elongate in conveying direction, and the interspace between adjacent link elements may be broadened transverse to the conveying direction to allow a link element of a consecutive module to slide into the interspace upon rotation of consecutive modules about an axis perpendicular to the conveying plane, so that consecutive modules can collapse into each other to a position of reduced pitch at at least a radial inward portion of the conveyor belt. In addition or as an alternative, hinge openings may e.g. be cylindrical and oversized relative to the hinge pins, and/or the protrusions and interspaces may be V-shaped.

Preferably, the modules are made to include less or no metal, e.g. smaller, less or no metal inserts, and preferable of plastics material only.

The invention further relates to a conveyor system, comprising a conveying track that extends in a conveying direction between return elements, and a side flexing modular conveyor belt in any of the embodiments discussed above arranged to form an endless loop between the return elements, so that a top run of the modular conveyor belt can circulate over the conveying track. Advantageously the conveyor system is embodied as a spiral conveyor in which a portion of the conveying track follows a spiral path, the side flexing conveyor belt is arranged to collapse at a radial inward edge only, and to maintain or increase pitch at the radial outward edge opposite edge compared to the pitch in conveying direction when running straight, and the auxiliary hinge pin is arranged at the radial outward edge of the conveyor belt. The side flexing conveyor belt may be made up of standard plastic side flexing modules or dedicated spiral conveyor modules, e.g. modules with protrusions designed for collapsibility at the radial inner edge of the belt, modules with protrusions designed for transfer of tensile load at the radial outer edge of the belt, modules with protrusions designed for support of products and/or passing of heat transfer medium in the center. Depending on a range of the width of conveyor belt and a range of the turn radius in the spiral, the auxiliary hinge pin may be chosen from a set of auxiliary hinge pins of different materials, e.g. suitable for different tensile loads, and/or different conicity.

The invention further relates to an auxiliary hinge pin including one or more of the features relating to the auxiliary hinge pin set out above.

The invention further relates to a method of transferring tensile load in a side flexing modular conveyor belt including module rows succeeding each other in a conveying direction that are hingedly coupled via hinge elements that extend transverse to the conveying direction, preferably a side flexing modular conveyor belt including one or more features set out relating to the side flexing modular conveyor belt set out above, wherein the hinge elements between successive module rows comprise a main hinge pin and an auxiliary hinge pin, and wherein a tensile load is applied to the conveyor belt to move the conveyor belt in conveying direction along a conveying track, and wherein in a curved portion of the conveying track in a portion of the conveyor belt that rounds a turn the tensile load is transferred between module rows by the auxiliary hinge pins only. In particular in the portion of the conveyor belt that rounds a turn the tensile load is transferred between module rows by the auxiliary hinge pins only, the tensile load is transferred between at least two successive module rows via a plurality of sets of cooperating coupling elements. Preferably, in a straight portion of the conveying track the tensile load is transferred between module rows via the main hinge pins only.

It should be noted that within the context of the invention, the features disclosed above may be each be isolated from their context, and/or may be combined.

Further embodiments of the invention are set out in the appended claims.

The invention will be further elucidated on the basis of a non-limiting exemplary embodiment, which is represented in the drawings. In the drawings.

Figure 1:
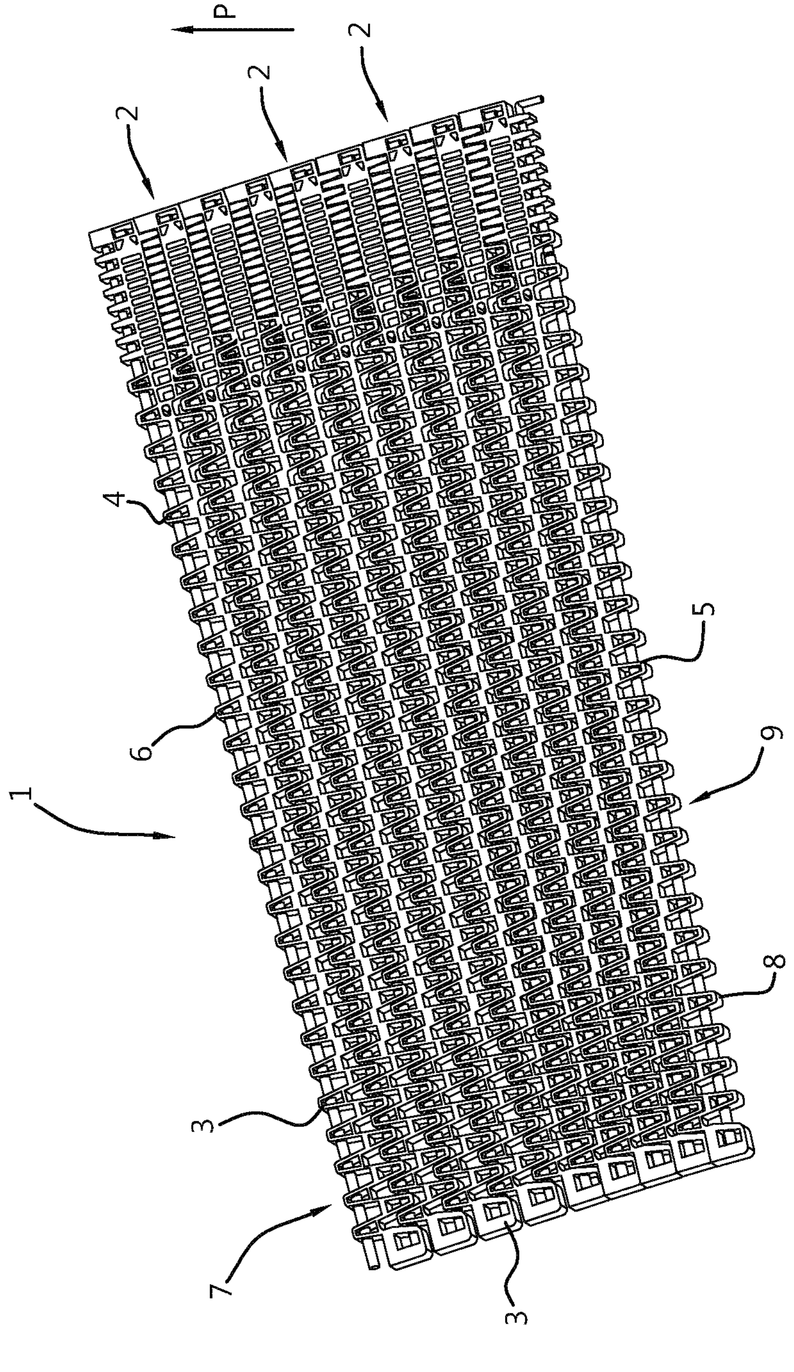
FIG. 1 shows a schematic perspective view of a section of a side flexing modular conveyor belt in accordance with the invention including a portion that runs straight and a portion that rounds a bend.
Figure 6A:
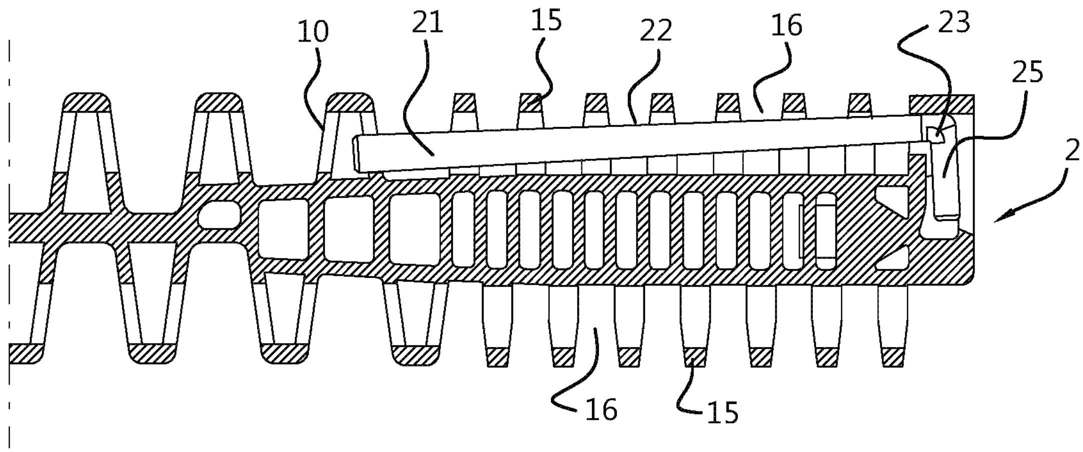
Figure 6B:
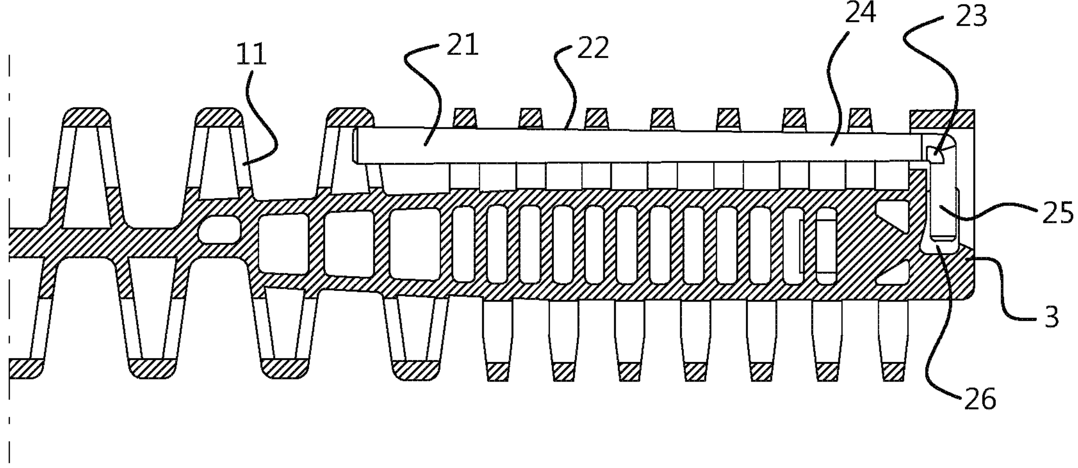
Figure 7:
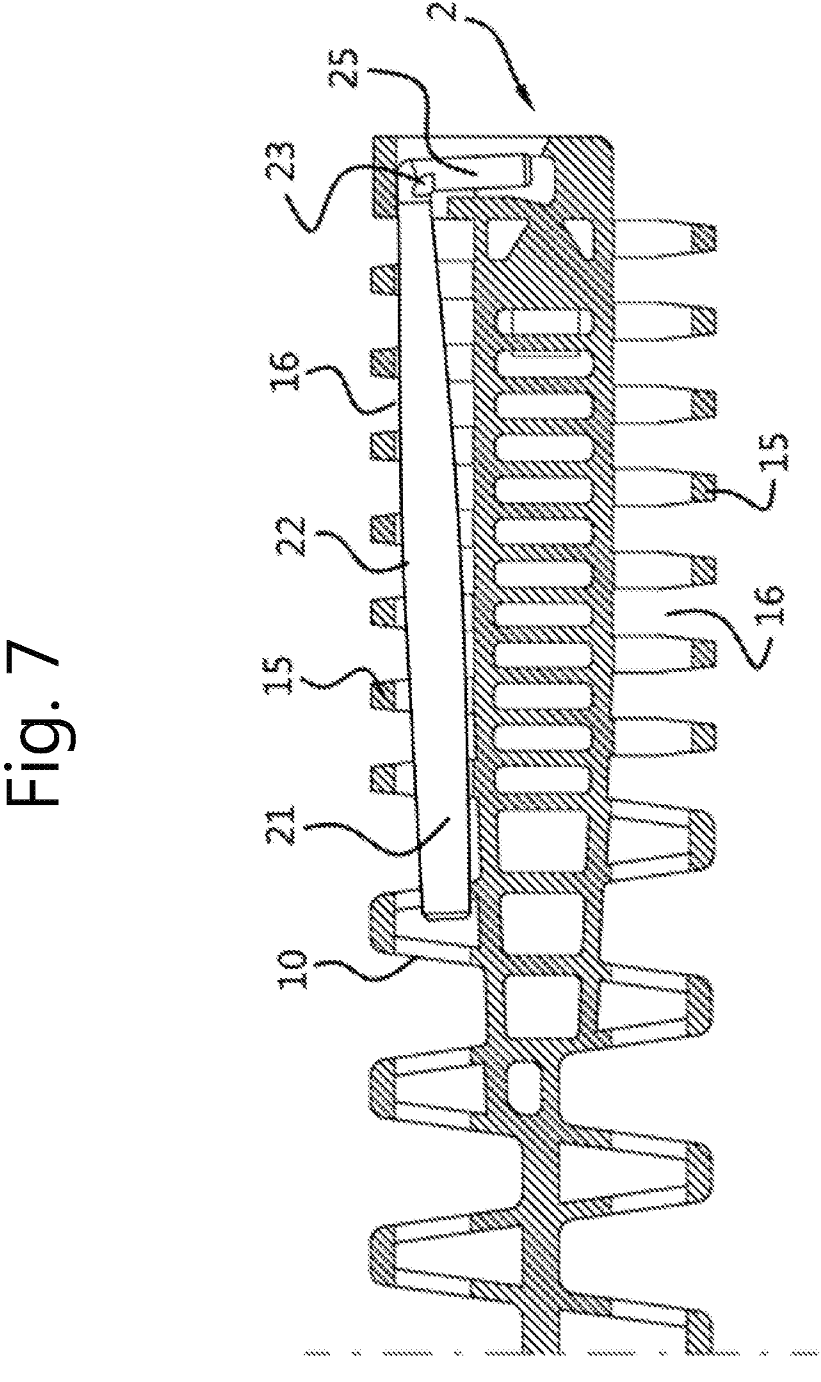
Figure 8:
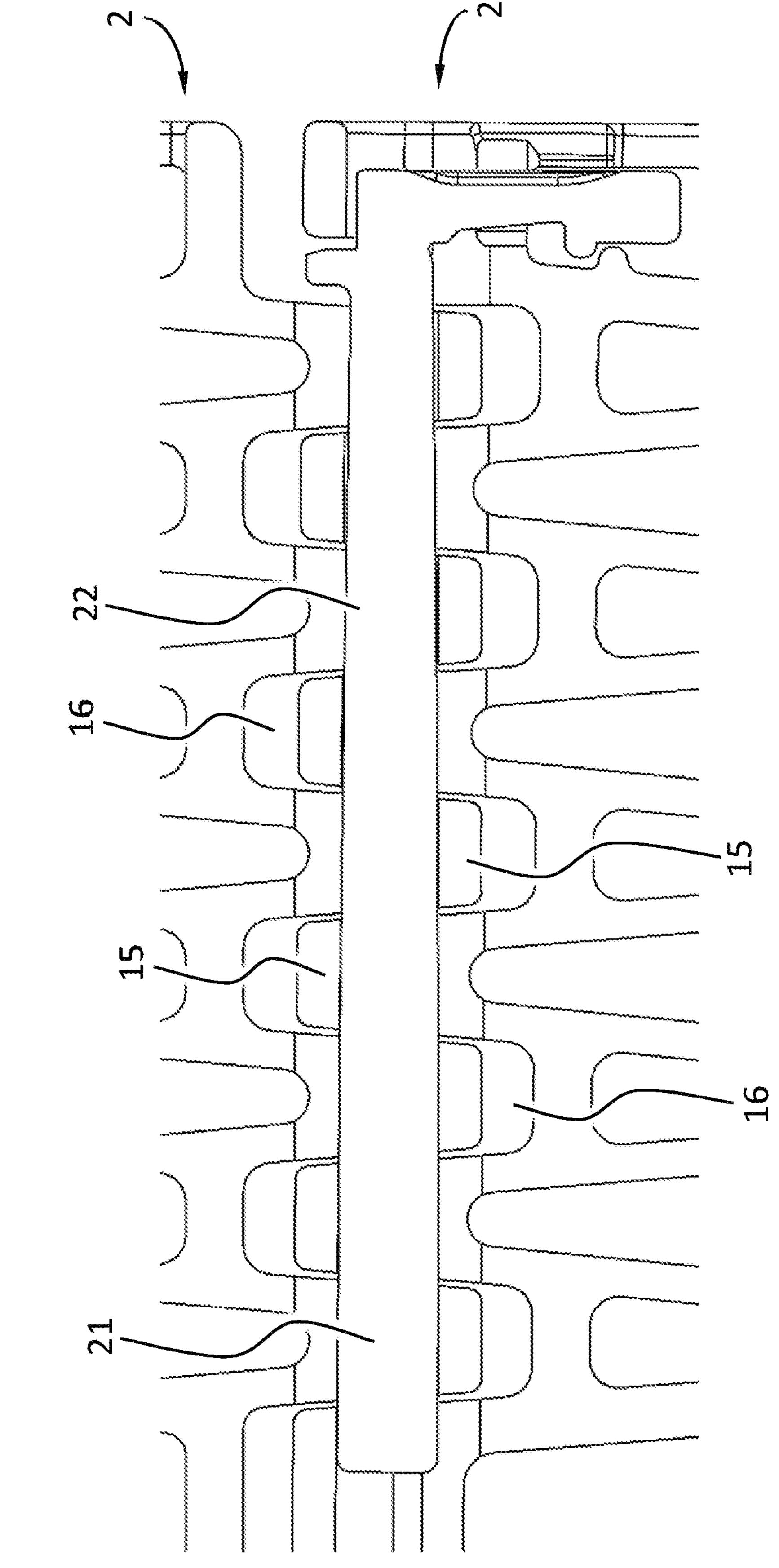

FIG. 6*a* and FIG. 6*b* show an auxiliary hinge pin being held with play in a cross sectioned module of the side flexing modular conveyor belt of FIG. 1;

FIG. 7 illustrates an embodiment of an auxiliary hinge pin with curved longitudinal sides;

FIG. 8 provides another or further embodiment of an auxiliary hinge pin with curved longitudinal sides.

Figure 2:
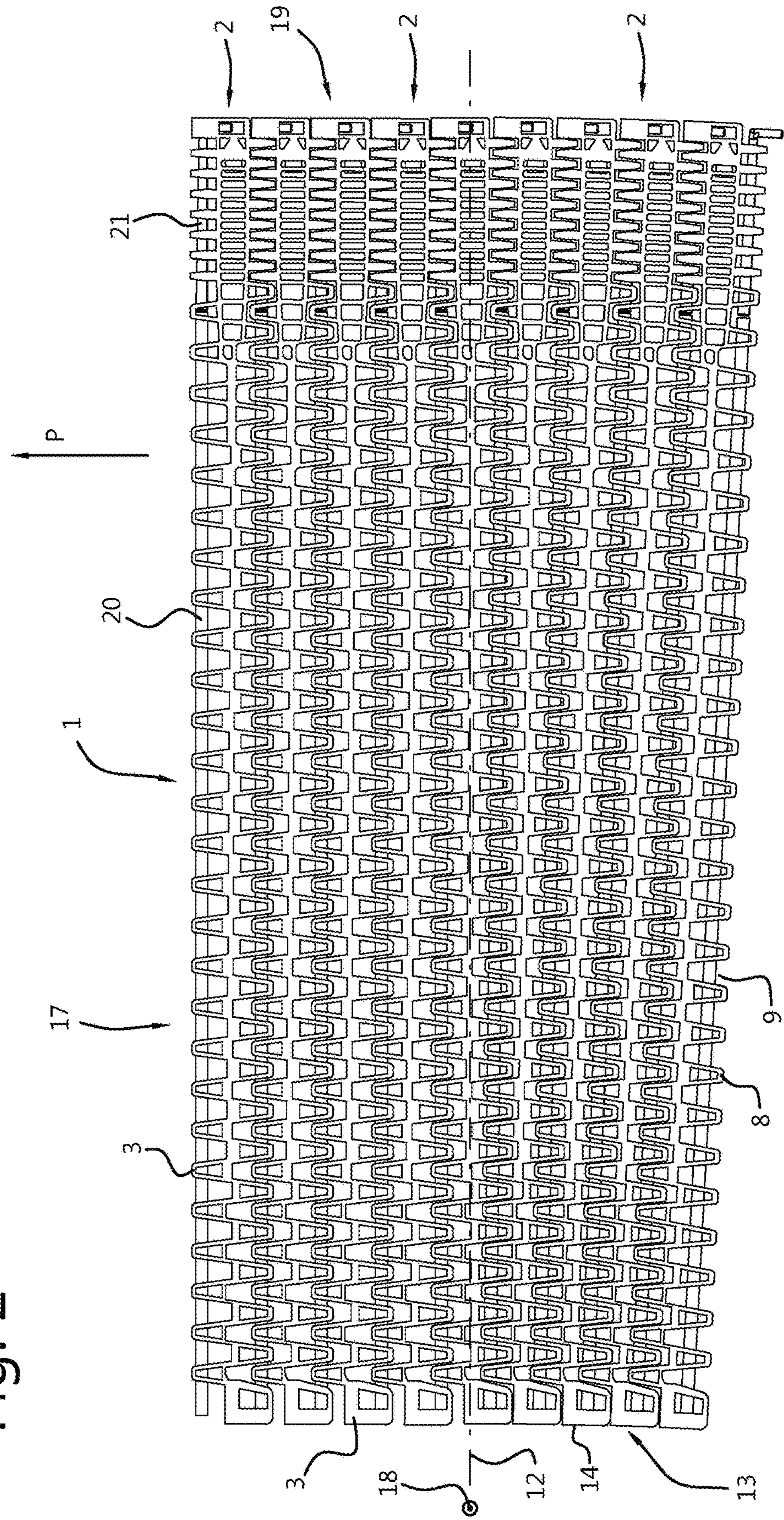
FIG. 2 shows a top view of the side flexing modular conveyor belt of FIG. 1.
Figure 3:
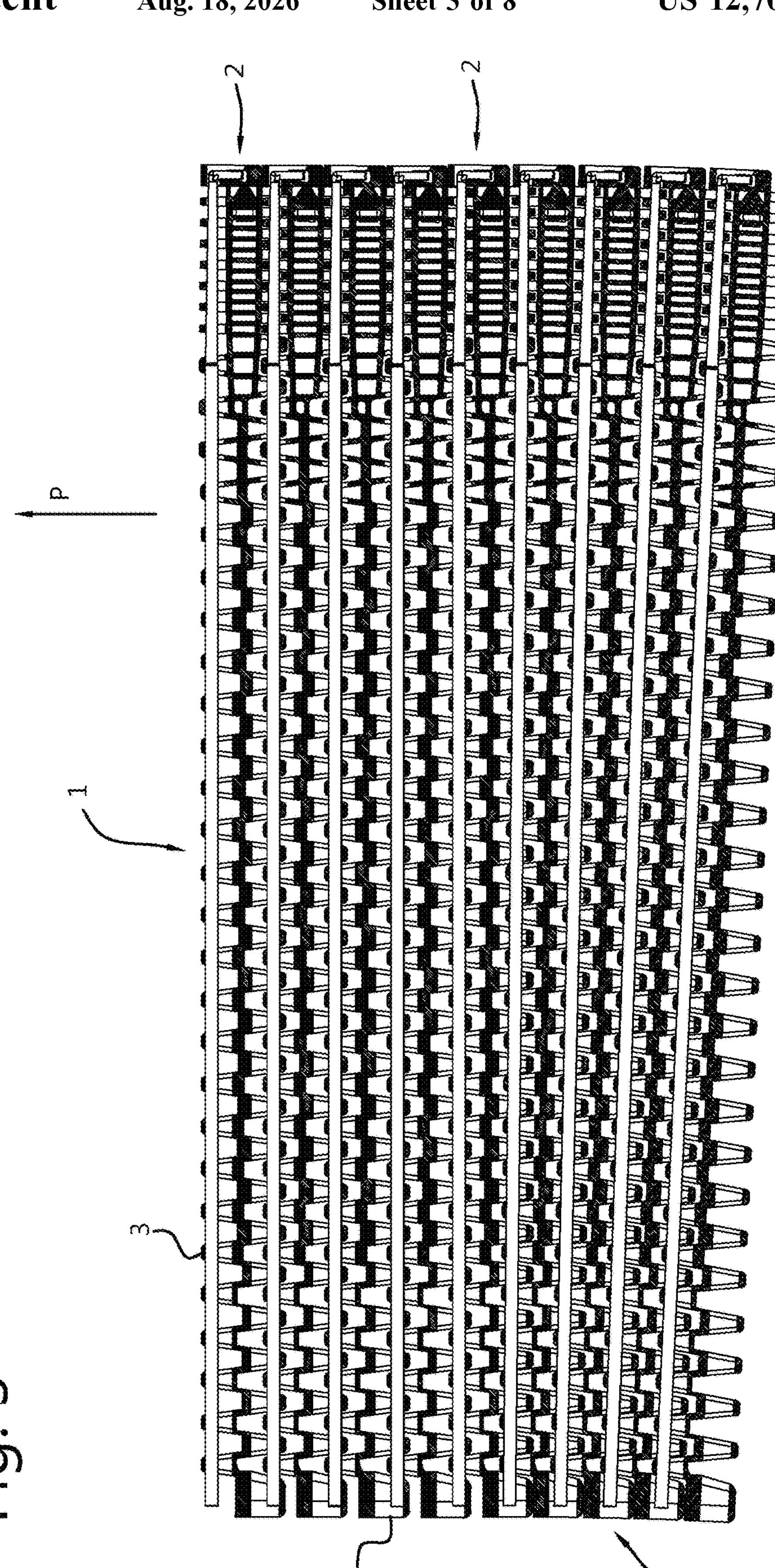
FIG. 3 shows a cross section of the side flexing modular conveyor belt of FIG. 2.

It is noted that the drawings are only schematic representations of an exemplary embodiment of the invention. In the drawings, identical or corresponding parts are represented with the same reference numerals. Referring to FIGS. 1 through 3 a side flexing modular conveyor belt 1 is shown. The side flexing modular conveyor belt 1 comprises a plurality of rows 2 of conveyor modules 3. The rows 2 are arranged successively in a conveying direction P. Each row 2 comprises three conveyor modules 3 arranged side by side transversely to the conveying direction P. In this embodiment, the modules 3 have been injection molded from POM, but may alternatively have been molded form e.g. PP or PA.

Top faces 4 of the conveyor modules 3 together form a conveying plane 5. The modules 3 are provided with forward link elements 6 at a front side 7 of the module 3 that extend in conveying direction P and with rearward link elements 8 at a rear side 9 of the module 3 that extend opposite to the conveying direction P. The forward and rearward link elements 6, 8 of modules 3 of successive rows 2 are hingedly coupled with hinge elements 10 that extend transversely to the conveying direction P through hinge openings 11 in the hinge elements 10. The modules 3 can rotate relative to each about a first axis 12 in or parallel to the conveying plane 5.

In addition, the modules 3 can rotate about a second axis perpendicular to the conveying plane 5. The hinge openings 11 in the link elements 6, 8 are elongate in conveying direction P and have conventional half cylindrical end portions. As can be seen in FIGS. 1-3 in the portion ii of the conveyor belt 1 that rounds a bend 13, a portion of a radial inner lateral edge 14, the protrusions 15 and interspaces 16 are V-shaped to allow a link element 6, 8 of a consecutive module 3 to slide into the interspace 16 upon rotation of consecutive modules 3 about an axis perpendicular to the conveying plane 18, so that consecutive modules 3 can collapse into each other to a position of reduced pitch compared to the pitch at the portion i of the conveyor belt that runs straight, at at least a radial inward portion 17 of the conveyor belt 1.

The side flexing conveyor belt 1 is in this embodiment arranged to collapse at a radial inward edge 14 only, and to maintain pitch or slightly increase pitch at the radial outward edge opposite edge compared to the pitch in conveying direction when running straight. The side flexing conveyor 1 has been made up of modules 3 with protrusions 15 designed for collapsibility at the radial inner edge 14 of the belt, modules 3 with protrusions 15 designed for transfer of tensile load at the radial outer edge 19 of the belt, and modules 3 with protrusions 15 designed for support of products and/or passing of heat transfer medium in the center.

The hinge elements 10 between successive rows 2 of conveyor modules 3 comprise a main hinge pin 20 that extends along the first axis 12 across at least a center of the conveyor belt 1. The hinge elements 10 further comprise an auxiliary hinge pin 21 that extends along the first axis 12 from a lateral edge of the conveyor belt 1 towards the center of the conveyor belt 1. The main hinge pin 20 is substantially cylindrical with a first cross sectional dimension in conveying direction, e.g. a diameter of about 7 mm. The auxiliary hinge pin 21 includes a tapered section that is tapered, in this example conical. The conical section 22 tapers off towards said opposite lateral edge 19 of the conveyor belt 1 from said first cross sectional dimension, in this case first a diameter near the main hinge pin 20 that is the same as the dimension of the main hinge pin to a second, smaller cross sectional dimension in conveying direction, e.g. a diameter of about 3 mm adjacent the lateral edge of the conveyor belt 1. The conical section may alternatively taper to second dimension of about 4-6 mm.

The cylindrical main hinge pin 20 is in this embodiment made of PBT, but may alternatively be made of PP, POM, PA. The main hinge pin has been extruded to a standard length and has been cut in length to so as to together with the auxiliary hinge pin 21 provide a hinge element 10 that matches the width of the conveyor belt 1. The auxiliary hinge pin 21 has been injection molded and is in this example made of PBT, but may alternatively be made of PP, POM, PA, or even of metal.

In this embodiment, the auxiliary hinge pin 21 is arranged at the radial outward edge 19 of the conveyor belt 1. The conical section 22 extends along 8 sets of cooperating forward and rearward protrusions 15 of modules 3 of successive rows 2. The axial length of the main hinge pin 20 is 5× the axial length of the auxiliary hinge pin 21. The axial length of the auxiliary hinge pin 21 is in this embodiment about 12 cm.

Figure 4:
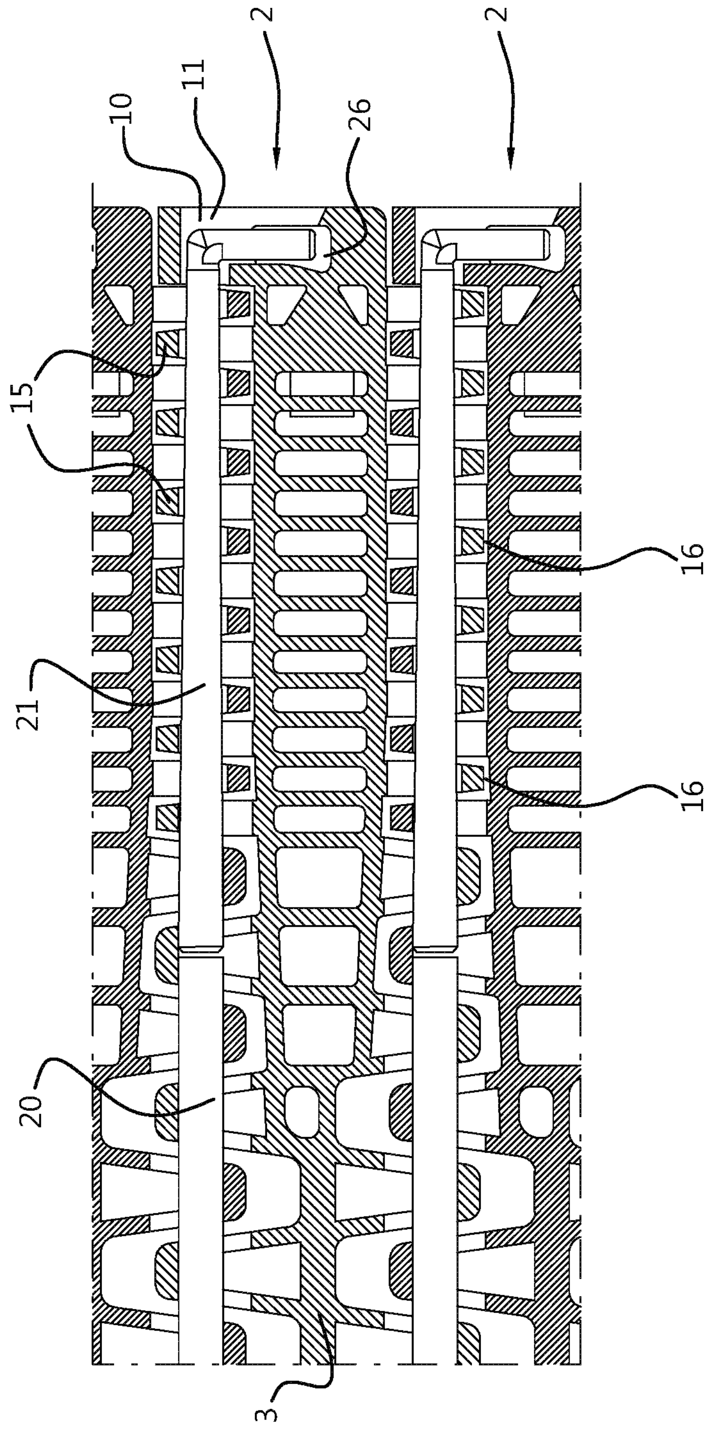
FIG. 4 shows a detail of the portion of the side flexing modular conveyor belt FIG. 3 that runs straight.
Figure 5:
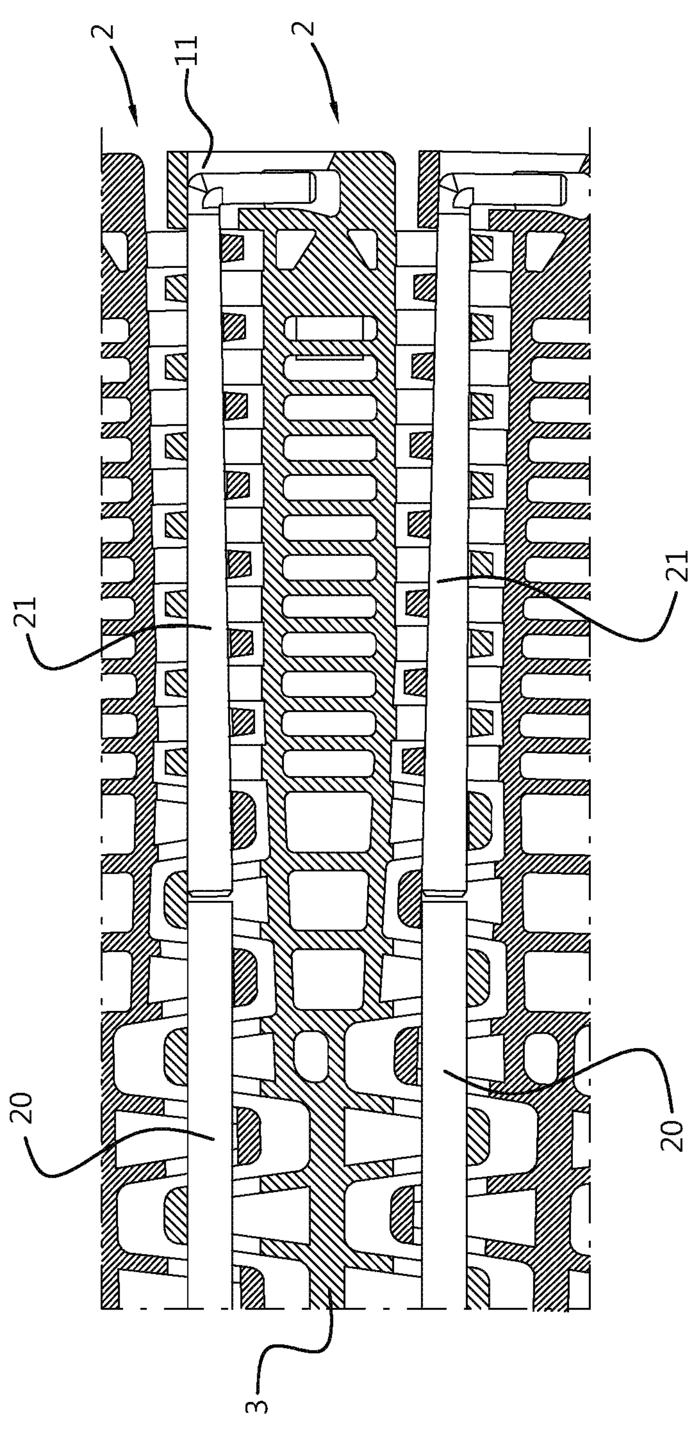
FIG. 5 shows a detail of the straight running portion of the side flexing modular conveyor belt FIG. 3 that rounds a bend.

Referring to FIGS. 4 and 5 respectively, in the straight running portion of the conveyor belt 1 the tensile load can be transferred by the main hinge pin 20 only, and in the portion of the conveyor belt 1 that rounds a turn 13 the tensile load can be transferred by the auxiliary hinge pin 21 only. Due to it being a separate section of the hinge element 10, when rounding a turn 13 the auxiliary hinge pin 21 reliably cooperates with the 8 of sets of cooperating protrusions 15 that it extends along, thus improving the capacity of the conveyor belt 1 for absorbing tensile load when rounding a turn 13.

Referring to FIGS. 6*a* and 6*b* respectively, the auxiliary hinge pin 21 includes a radial protrusion 23 at the lateral edge 19 of the conveyor belt 1 adjacent the conical section 22 to prevent rotation about its axis and or axial migration. In this embodiment, the auxiliary hinge pin 21 is L shaped. The conical section 22 forms the leg 24 of the L shape and the radial protrusion 23 forms the foot 25 of the L shape. The radial protrusion 23 is held at the lateral edge of the conveyor belt 1 with play so as to allow limited sliding movement along its longitudinal axis, limited sliding movement transverse to its longitudinal axis and limited rotational movement about an axis perpendicular to the conveying plane 5. This facilitates settlement of the auxiliary hinge pin 21 into contact with the 8 cooperating forward and rearward protrusions 15 that it extends along. In this embodiment, this has been arranged by holding the leg 24 of an L shaped auxiliary hinge pin 21 in an oversized locking chamber 26 that has been provided in the lateral outward end of the end module 3 at the radial outward lateral edge 19 of the conveyor belt 1.

The side flexing modular conveyor belt 1 discussed above may be arranged to form an endless loop between the return elements of a conveying track of a conveying system, so that a top run of the modular conveyor belt 1 can circulate over the conveying track of a conveyor system in a conveying direction P between return elements. The conveyor system may be embodied as a spiral conveyor in which a portion of the conveying track follows a spiral path.

Thus, a method of transferring tensile load in a side flexing modular conveyor belt 1 is disclosed including module rows 2 succeeding each other in a conveying direction P that are hingedly coupled via hinge elements that extend transverse to the conveying direction, wherein the hinge elements between successive module rows 2 comprise a main hinge pin 20 and an auxiliary hinge pin 21, and wherein a tensile load is applied to the conveyor belt 1 to move the conveyor belt in conveying direction along a conveying track, and wherein in a straight portion of the conveying track the tensile load is transferred between module rows in a portion i of the conveyor belt that runs straight via the main hinge pins 20 only, and wherein in a curved portion of the conveying track in a portion of the conveyor belt ii that rounds a turn the tensile load is transferred between module rows 2 by the auxiliary hinge pins 21 only. Due to the auxiliary hinge pin 21 being a separate section of the hinge element, positioning the auxiliary hinge pin to engage a plurality of radial outward protrusions when negotiating a turn is facilitated. In the portion of the conveyor belt that rounds a turn the tensile load is transferred between module rows by the auxiliary hinge pins only, the tensile load is transferred between at least two successive module rows via a plurality of sets of cooperating coupling elements. This may in particular be dune via the tapered section. In this example, in a straight portion of the conveying track the tensile load is transferred between module rows via the main hinge pins only. Alternatively, the auxiliary hinge pin may also transfer a part of the tensile load in the portion of the conveyor belt that runs straight, e.g. a cylindrical portion of the auxiliary hinge pin that is adjacent the main hinge pin.

Depending on a range of the width of conveyor belt 1 and a range of the turn radius in the spiral, the auxiliary hinge pin 21 may be chosen from a set of auxiliary hinge pins 21 of different materials and/or different conicity to match a desired tensile load, width and turn radius of the modular conveyor.

The invention is not limited to any specific example given in this description. For example, in some embodiments of the modular conveyor belt and conveyor system described herein, the main hinge pin has a first cross sectional dimension in conveying direction, e.g. a first diameter, and the auxiliary hinge pin includes a conical section that tapers off from a second cross sectional dimension in the conveying direction, e.g. a second diameter, that is larger than the first cross sectional dimension. The transition between the first and second cross sectional dimension can for example be provided by the main hinge pin, in a continuous or discrete fashion, e.g. as a gradient or a step in its outer surface. In such cases, the conical section of the auxiliary hinge pin may be extended along the main hinge pin. Alternatively, the transition can be provided by the separation between the main hinge pin and auxiliary hinge pin. In such cases, the auxiliary hinge pin may include a cylindrical section between the transition and the conical section.

The first cross sectional dimension can e.g. comprise an outer diameter ranging between 4-6 millimeter, preferably about 5 millimeter. The second cross sectional dimension can e.g. comprise an outer diameter ranging between 6-8 millimeter, preferably about 7 millimeter. In this way, a minimal radial strength and/or load transferring capacity of the auxiliary hinge pin can be maintained along the axial length of the auxiliary hinge pin while the auxiliary hinge pin tapers off, e.g. towards a lateral edge of the conveyor belt module.

The auxiliary hinge pin 21 may comprise a tapered section that is substantially conical, and that includes curved (e.g. convex) longitudinal sides, e.g. as illustrated in FIGS. 7 and 8. The illustrated radial protrusion 25 at the distal end of the conical section 22 is optional, as described above. The curved outer surface of the auxiliary hinge pin may have a curvature that is constant or variable along the axial length of the auxiliary hinge pin 21. For example, the curved longitudinal sides of the auxiliary hinge pin may me shaped to correspond with a radius of curvature of the conveyor belt and/or the relative orientation of the protrusions 15 with respect to the auxiliary hinge pin 21 when rounding a turn. By having curved (e.g. convex) longitudinal sides, the auxiliary hinge pin 21, when in use in a conveyor belt module as described herein, is able to cooperate with a larger number of adjacent hinge openings in protrusions 15 when the conveyor belt module is rounding a turn. The curved outer surface of the auxiliary hinge pin minimizes the distance between the protrusions and the auxiliary hinge pin. This ensures that, e.g. due to the elastic deformation of the modules (and hinges) under load, an increased number of protrusions encounter the auxiliary hinge pin during use. For example, in use, up to eight protrusions may be in contact with the auxiliary hinge pin when rounding a turn. As such, the load is distributed over several hinge eyes, which reduces the tension in the eyes and makes it possible to place a higher load on the chain. As a result, compared to an auxiliary hinge pin with straight longitudinal sides, the total contact area between the curved, e.g. convex, auxiliary hinge pin and the protrusions is increased, which, in turn, reduces contact stresses and prevents mechanical fatigue in the conveyor belt module.

Different chain widths and corner-ratios result in a different angle between adjacent subsequent rows in the conveying direction and therefore will result in different distances between a hinge pin and the hinge eyes. For this reason, conventional modular conveyor belts may be fitted with a specific hinge pin that is able to cope with a single chain width and corner-ratio only.

In contrast, the conveyor belt described herein may be made up of standard modules to a desired width and be used for a desired turn radius, and only a set of auxiliary hinge pins, e.g. a set comprising 2-5 auxiliary hinge pins, need be provided from which an auxiliary hinge pin may be selected that has a taper to match the chosen conveyor width and width to turn radius ratio. Also, a selected auxiliary hinge pin may be dimensioned to correspond with a minimum inner pitch between successive conveyor belt modules on an inside radius of the conveyor belt when negotiating a turn. Alternatively, or additionally, a selected auxiliary hinge pin may be dimensioned to correspond with a maximum outer pitch between successive conveyor belt modules on an outside radius of the conveyor belt when rounding a turn. In this way, a limited number of selectable auxiliary hinge pins can cover a large range of conveyor belts, in particular to match various conveyor widths and width to turn radius ratios.

As illustrated in FIG. 8, the auxiliary hinge pin 21 can be provided with a projection extending outward from a longitudinal side of the auxiliary hinge pin in a direction normal to the axial length of the auxiliary hinge pin, e.g. from the conical section 22. The projection may be arranged to, in use, abut a protrusion 15 of the conveyor belt module, to axially constrain a distal end of the auxiliary hinge pin 21 with respect to the conveyor belt module. FIG. 8 further illustrates that the auxiliary hinge pin 21 can be provided with a further projection, e.g. extending outward from the optional radial protrusion 25 at the distal end of the auxiliary hinge pin in a direction parallel to the axial direction of the auxiliary hinge pin 21. The further projection may be arranged to, in use, abut a contact surface of the conveyor belt module to radially constrain the distal end of the auxiliary hinge pin 21 with respect to the conveyor belt module. When rounding a turn, the subsequent rows of the conveyor may module move and tilt with respect to each other, and as a result, the relative position and orientation of the protrusions 15 and hinge openings 16 may vary. By constraining the distal end of the auxiliary hinge pin both axially as well as radially, respectively, by the projection and the further projection, the position of the auxiliary hinge pin is constrained with respect to the conveyor belt module at the distal end, while the proximal end of the auxiliary hinge pin is allowed to pivot slightly to allow the auxiliary hinge pin to settle between the protrusions 15 and hinge openings 16 as the conveyor belt module is rounding a turn, thus increasing the effective contact area between the auxiliary hinge pin and the conveyor belt module. This improves the load transferring capacity of the auxiliary hinge pin and the conveyor belt module.

In addition, it is observed that the conveyor belt, conveyor belt module and hinge pin may include any of the features set out in relation to the prior art in the introductory portion of the description. Further it is observed that many variations will be apparent to the person skilled in the art. For example, the shape and size of the protrusions may vary across the width of the conveyor and even across the width of the module. Such variations are understood to be comprised within the scope of the invention defined in the appended claims.

LIST OF REFERENCE SIGNS

1. Side flexing modular conveyor belt
2. Rows
3. Modules
4. Top face
5. Conveying plane
6. Forward link element
7. Front side
8. Rearward link element
9. Rear side
10. Hinge element
11. Hinge opening
12. First axis
13. Bend
14. Radial inner edge
15. Protrusion
16. Interspace
17. Radial inward portion
18. Axis perpendicular to the conveying plane
19. Radial outer edge
20. Main hinge pin
21. Auxiliary hinge pin
22. Conical section
23. Radial protrusion
24. Leg
25. Foot
26. Locking chamber
27. Projection
28. Further projection
P. Conveying direction
i portion of the conveyor belt that runs straight
ii portion of the conveyor belt that rounds a bend

What is claimed is:

1. Side flexing modular conveyor belt, comprising a plurality of rows of conveyor modules, the rows being arranged successively in a conveying direction, and each row comprising one or more conveyor modules arranged side by side transversely to the conveying direction, so that top faces of the conveyor modules together form a conveying plane, the modules being provided with forward link elements at a front side of the module that extend in conveying direction and with rearward link elements at a rear side of the module that extend opposite to the conveying direction, forward and rearward link elements of modules of successive rows being hingedly coupled with hinge elements that extend transversely to the conveying direction through hinge openings in the hinge elements so that the modules can rotate relative to each other about a first axis in or parallel to the conveying plane as well as about a second axis perpendicular to the conveying plane, wherein the hinge elements between successive rows of conveyor modules comprise a main hinge pin that extends along the first axis across at least a center of the conveyor belt, and an auxiliary hinge pin that extends along the first axis from a lateral edge of the conveyor belt towards the center of the conveyor belt, wherein the main hinge pin has a substantially constant cross section, with a first dimension in conveying direction, and wherein the auxiliary hinge pin includes a tapered section that tapers off towards an opposite lateral edge of the conveyor belt to a second, smaller dimension in conveying direction adjacent the lateral edge of the conveyor belt.

2. The side flexing modular conveyor belt according to claim 1, wherein the tapered section is conical.

3. The side flexing modular conveyor belt according to claim 1, wherein the tapered section tapers off towards said opposite lateral edge of the conveyor belt from said first dimension in conveying direction near the main hinge pin to a second, smaller dimension in conveying direction adjacent the lateral edge of the conveyor belt.

4. The side flexing modular conveyor belt according to claim 1, wherein the tapered section extends along at least 2 sets of cooperating forward and rearward protrusions of modules of successive rows.

5. The side flexing modular conveyor belt according to claim 1, wherein the tapered section extends along less than 10 sets of cooperating forward and rearward protrusions of modules of successive rows.

6. The side flexing modular conveyor belt according to claim 1, wherein the auxiliary hinge pin is less than half the axial length of the main hinge pin.

7. The side flexing modular conveyor belt according to claim 1, wherein the axial length of the main hinge pin is at least 1.5 the axial length of the main hinge pin.

8. The side flexing modular conveyor belt according to claim 1, wherein the axial length of the auxiliary hinge pin is less than about 10 cm or about 4 inch, and more than about 2.5 cm or about 1 inch.

9. The side flexing modular conveyor belt according to claim 1, wherein said auxiliary hinge pin is injection molded.

10. The side flexing modular conveyor belt according to claim 1 wherein the material properties of the auxiliary hinge pin differ from the material properties of the main hinge pin to withstand a higher tensile load.

11. The side flexing modular conveyor belt according to claim 1, wherein said auxiliary hinge pin includes a radial protrusion at the lateral edge of the conveyor belt adjacent the tapered section.

12. The side flexing modular conveyor belt according to claim 11, wherein the auxiliary hinge pin is L shaped, the tapered section forming the leg of the L shape and the radial protrusion forming the foot of the L shape.

13. The side flexing modular conveyor belt according to claim 12, wherein the radial protrusion is held at the lateral edge of the conveyor belt with play so as to allow limited sliding movement along its longitudinal axis, limited sliding movement transverse to its longitudinal axis and/or limited rotational movement about an axis perpendicular to the conveying plane for settlement of the auxiliary hinge pin into contact with a plurality of cooperating forward and rearward protrusions.

14. The side flexing modular conveyor belt according to claim 1, wherein the hinge elements between successive rows of conveyor modules comprise a further auxiliary hinge pin that extends along the first axis from an opposite lateral edge of the conveyor belt towards the center of the conveyor belt, wherein the further auxiliary hinge pin includes a tapered section that tapers off towards said opposite lateral edge of the conveyor belt.

15. The side flexing modular conveyor belt according to claim 1, wherein the hinge openings in the link elements are elongate in conveying direction, wherein the interspace between adjacent link elements is broadened transverse to the conveying direction to allow a link element of a consecutive module to slide into the interspace upon rotation of consecutive modules about an axis perpendicular to the conveying plane, so that consecutive modules can collapse into each other to a position of reduced pitch at at least a radial inward portion of the conveyor belt.

16. The side flexing modular conveyor belt according to claim 1, wherein the modules are made of plastics material only.

17. Conveyor system, comprising a conveying track that extends in a conveying direction between return elements, and a side flexing modular conveyor belt according to claim 1 arranged to form an endless loop between the return elements, so that a top run of the modular conveyor belt can circulate over the conveying track.

18. The conveyor system according to claim 17, which portion of the conveying track follows a spiral path, and wherein the side flexing conveyor belt is arranged to collapse at a radial inward edge only, and to maintain or increase pitch at the radial outward edge opposite edge, and wherein the auxiliary hinge pin is arranged at the radial outward edge of the conveyor belt.

19. The auxiliary hinge pin for a conveyor system in accordance with claim 17, wherein the auxiliary hinge pin comprises a tapered section that is conical, and that includes curved longitudinal sides.

20. Method of transferring tensile load in the side flexing modular conveyor belt according to claim 1, wherein the hinge elements between successive module rows comprise a main hinge pin and an auxiliary hinge pin, and wherein a tensile load is applied to the conveyor belt to move the conveyor belt in conveying direction along a conveying track, and wherein in a curved portion of the conveying track in a portion of the conveyor belt that rounds a turn the tensile load is transferred between module rows by the auxiliary hinge pins only.

21. The method of claim 20, wherein in the portion of the conveyor belt that rounds a turn the tensile load is transferred between module rows by the auxiliary hinge pins only, the tensile load is transferred between at least two successive module rows via a plurality of sets of cooperating coupling elements.

22. The method of claim 21, wherein, in a straight portion of the conveying track the tensile load is transferred between module rows via the main hinge pins only.

* * * * *